No. 831,678. PATENTED SEPT. 25, 1906.
A. OSBORNE.
DEVICE FOR NOURISHING AND STRENGTHENING THE GROWTH OF TREES.
APPLICATION FILED APR. 25, 1906.

UNITED STATES PATENT OFFICE.

ANNA OSBORNE, OF SANTA ANA, CALIFORNIA.

DEVICE FOR NOURISHING AND STRENGTHENING THE GROWTH OF TREES.

No. 831,678.      Specification of Letters Patent.      Patented Sept. 25, 1906.

Application filed April 25, 1906. Serial No. 313,645.

*To all whom it may concern:*

Be it known that I, ANNA OSBORNE, a citizen of the United States, residing at Santa Ana, in the county of Orange and State of California, have invented certain new and useful Improvements in Devices for Nourishing and Strengthening the Growth of Trees, of which the following is a specification.

My invention relates to the culture of trees, and especially to the various varieties of fruit-trees, and has for its object the provision of a device for collecting atmospheric electricity and conveying it to the tree-trunk to nourish the tree and also to invigorate its growth, so that it is able to withstand the rigors of unusual cold weather.

My invention will be described in detail hereinafter and illustrated in the accompanying drawings, in which—

Figure 1:
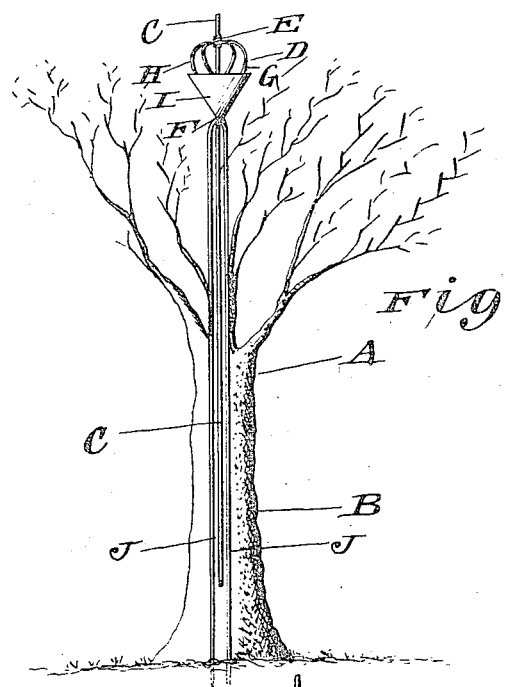
Figure 2:
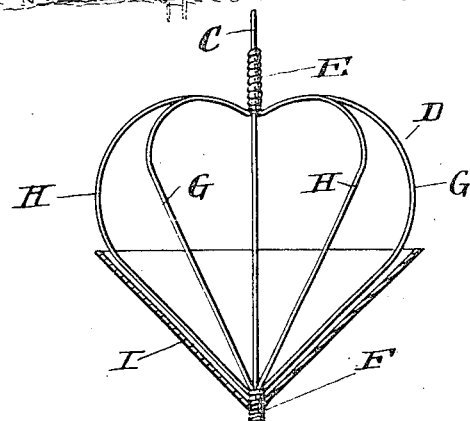

Figure 1 is a view of a tree, showing my improved device attached thereto; and Fig. 2, a view, on an enlarged scale, partly in section, of the device for collecting the electricity at the top of tree.

In the drawings similar reference characters indicate corresponding parts in both views.

A represents a tree, and B the trunk thereof.

C represents a copper wire driven into the tree-trunk B and then bent upwardly and extended above the top of the tree an appreciable distance. About six inches below the upper end of copper wire C is formed a cage-like structure D, composed of alternating copper and iron wires secured above and below said structure D by means of separate winding wire or by twisting the strands comprising said structure on the copper wire, said windings being designated by the reference characters E and F above and below said structure D, respectively, while G and H indicate the copper and iron wires, respectively, constituting said cage-like structure. Secured to the lower winding F is a conical-shaped cup I, made of zinc.

J represents wires made of iron and either secured in winding F, so as to engage the wires H, or part of said wires H may be formed from the bent upper ends of wires J. The lower ends of the wires J are buried in the ground at the base of trunk B.

In operation the upper end of wire C, together with the cage-like structure D and cup I, being composed of different metals, set up an electric action, fed by atmospheric electricity, which passes downwardly through copper wire C and into the trunk of the tree, from whence it passes downwardly to the earth and upwardly through the limbs and foliage to the atmosphere, the iron wires J completing the circuit between the earth and the cage-like structure D. As the wood of the tree is a slow conductor of electricity, the fibers thereof are warmed by the retardation of the current, so that the tree is invigorated and strengthened and made able to withstand light frosts which occasionally visit the southern parts of the United States and which not only destroy the fruit-crops, but also kill the trees.

Having thus described my invention, what I claim is—

1. In combination with a growing tree, a structure comprising wires of two different metals and a cup of a third metal, a wire extending from said structure to the body of the tree, and wires extending from said structure to the earth, substantially as shown and described.

2. In combination with a growing tree, a cage-like structure comprising longitudinal wires of two different metals, a cup made of a third metal secured beneath said cage-like structure, a wire secured to said cage-like structure and to the tree-trunk, and wires secured to the cage-like structure and in the earth, substantially as shown and described.

3. In combination with a growing tree, a length of copper wire secured to the tree-trunk and extending above the top of the tree, a cage-like structure consisting of wires of two different metals secured below the top end of said copper wire, and iron wires secured to said cage-like structure and in the earth at the foot of the tree, substantially as shown and described.

4. In combination with a growing tree, a length of copper wire secured to the tree-trunk and extending above the top of the tree, a cage-like structure consisting of wires of two different metals secured below the top end of said copper wire, a cup made of a third kind of metal secured below said cage-like structure, and iron wires secured to said cage-like structure and in the ground, substantially as shown and described.

5. In combination with a growing tree, a length of copper wire secured to the tree-trunk and extending above the top of the tree, a cage-like structure made of longitudinal wires of iron and copper arranged alternately, said structure secured below the upper end of said copper wire, and iron wires secured to said cage-like structure and in the earth, substantially as shown and described.

6. In combination with a growing tree, a length of copper wire secured to the tree-trunk and extended above the top of the tree, a cage-like structure made of longitudinal wires of iron and copper arranged alternately, said cage-like structure secured below the upper end of said copper wire, a conical-shaped cup made of zinc secured below said cage-like structure, and iron wires secured to said cage-like structure and cup and extending into the earth at the foot of the tree, substantially as shown and described.

In testimony whereof I hereto affix my signature in the presence of the witnesses.

ANNA OSBORNE.

Witnesses:
 W. H. YOUNG,
 HORATIO J. FORGY,
 S. FORGY.